United States Patent
Roberts et al.

(10) Patent No.: US 8,292,303 B2
(45) Date of Patent: Oct. 23, 2012

(54) MANIFOLD GASKET HAVING PUSHROD GUIDE

(75) Inventors: Brian Roberts, Carpentersville, IL (US); Gerald Rosenquist, Lake Zurich, IL (US); Joseph Hermanson, Chicago, IL (US)

(73) Assignee: Federal-Mogul Worldwide, Inc., Southfield, MI (US)

( * ) Notice: Subject to any disclaimer, the term of this patent is extended or adjusted under 35 U.S.C. 154(b) by 376 days.

(21) Appl. No.: 11/877,362

(22) Filed: Oct. 23, 2007

(65) Prior Publication Data

US 2008/0036158 A1    Feb. 14, 2008

Related U.S. Application Data

(62) Division of application No. 11/193,812, filed on Jul. 29, 2005, now Pat. No. 7,302,925.

(51) Int. Cl.
*F01L 1/16* (2006.01)
*F02F 11/00* (2006.01)

(52) U.S. Cl. .................. 277/598; 123/90.61; 123/193.3

(58) Field of Classification Search .......... 277/590–598; 123/90.61, 90.37, 193.3, 193.5
See application file for complete search history.

(56) References Cited

U.S. PATENT DOCUMENTS

| | | | |
|---|---|---|---|
| 2,771,869 A * | 11/1956 | Leach | 123/193.3 |
| 3,086,507 A * | 4/1963 | Mooney, Jr. | 123/90.42 |
| 3,664,676 A * | 5/1972 | Peterson | 277/600 |
| 3,841,280 A | 10/1974 | Lussier | |
| 5,105,777 A | 4/1992 | Kronich et al. | |
| 5,415,138 A | 5/1995 | Hudson | |
| 5,642,701 A | 7/1997 | Oswald et al. | |
| 5,983,849 A | 11/1999 | Wangen et al. | |
| 6,237,557 B1 | 5/2001 | Wiegert | |
| 6,609,717 B2 | 8/2003 | Hinson | |
| 6,883,483 B1 | 4/2005 | Knudsen et al. | |
| 7,287,758 B2 * | 10/2007 | Sandford | 277/598 |
| 7,302,925 B2 * | 12/2007 | Roberts et al. | 123/90.61 |
| 7,401,404 B2 * | 7/2008 | Yetter et al. | 29/888.3 |
| 2006/0290073 A1 * | 12/2006 | Peterson | 277/598 |

FOREIGN PATENT DOCUMENTS

JP    61072809 A    4/1986

* cited by examiner

*Primary Examiner* — Alison Pickard
(74) *Attorney, Agent, or Firm* — Robert L. Stearns; Dickinson Wright, PLLC

(57) ABSTRACT

A manifold gasket assembly includes a steel carrier fabricated with a plurality of air intake openings. Rubber material is molded to the carrier body to provide a seal about the openings when the gasket assembly is clamped between a cylinder head and intake manifold. Pushrod guides are provided on the carrier body and are fabricated of a material different than that of the carrier body, namely the same material as that used to form the elastomeric sealing beads.

10 Claims, 2 Drawing Sheets

MANIFOLD GASKET HAVING PUSHROD GUIDE

This invention is a divisional application and claims priority to U.S. Ser. No. 11/193,812, filed Jul. 29, 2005 now U.S. Pat. No. 7,302,925.

BACKGROUND OF THE INVENTION

1. Technical Field

This invention generally relates to gaskets, and more particularly to intake manifold gaskets incorporating a feature for guiding the installation of pushrods of the engine.

2. Related Art

It is known to incorporate a feature into intake manifold gaskets for guiding pushrods during the assembly of the engine. One such gasket assembly includes a rigid carrier frame of the gasket made of plastic and formed with a plurality of media-conveying openings corresponding to associated openings communications between the cylinder head and the manifold between which the gasket is to be bolted. Elastomeric sealing beads are molded to both sides of the carrier about the media-conveying openings to seal the openings when the intake manifold is bolted to the cylinder head. A plurality of forked pushrod holder/guides molded as one piece with the rigid plastic carrier frame project out of the plane of the gasket at an angle and beyond its periphery. The guides support the pushrods on the carrier in a pre-assembly stage as the engine progresses along the assembly line. While such pushrod support/guides of this type are effective for their intended purpose, the shape, location, and rigid material of the forked guides presents an obstruction to the ultimate installation of the pushrods into their use position, the installation of the rocker arms and the positioning and mounting of the manifold on the cylinder head, making the assembly process of the engine more difficult than would be desired if the pushrod supports were not in the way.

The carrier frame of other known manifold gaskets is made of metal instead of plastic. Features such as the forked pushrod guide described above are not easily made from the metal carrier material without adding significant cost and manufacturing subs to the process. Even if they could be made, such a gasket would still suffer from the deficiencies of presenting an obstruction to the installation of the intake manifold, pushrods and rocker arms as described above.

The present invention overcomes or greatly minimizes the foregoing deficiencies of the prior manifold gaskets described above.

SUMMARY OF THE INVENTION AND ADVANTAGES

A manifold gasket assembly includes a carrier body adapted to be clamped between a cylinder head and an intake manifold of an engine. The carrier is formed with a plurality of media-conveying openings corresponding to media-conveying passages communicating between the manifold and head. Elastically resilient sealing material is disposed on the carrier body in surrounding relation to at least some of the openings to provide a fluid-type seal when the carrier body is clamped between the cylinder head and manifold. At least one pushrod guide is formed from a material different than that of a carrier body and is mounted on and projects from the carrier body adjacent at least one of the openings in position to guide a pushrod during its installation in the engine.

According to a further preferred aspect of the invention, the pushrod guide is fabricated of the same rubber sealing material as that which surrounds and seals the openings, and the carrier body is preferably fabricated of metal.

The gasket assembly of the invention has the advantage of using material other than the carrier body material to serve as the pushrod guide. Particular advantages are recognized when the pushrod guides are fabricated of the elastic sealing material, since the sealing material needs to be molded to the carrier body anyway and it is a simple task to simply extend the material to the area where the pushrod guide is desired.

Another advantage of fabricating the pushrod guide of the elastic sealing material is that it can be located where it is effective as a pushrod guide but out of the way during the assembly of other parts of the engine.

THE DRAWINGS

These and other features and advantages of the present invention will become more readily appreciated when considered in connection with the following detailed description and appended drawings, wherein.

DETAILED DESCRIPTION

Figure 1:
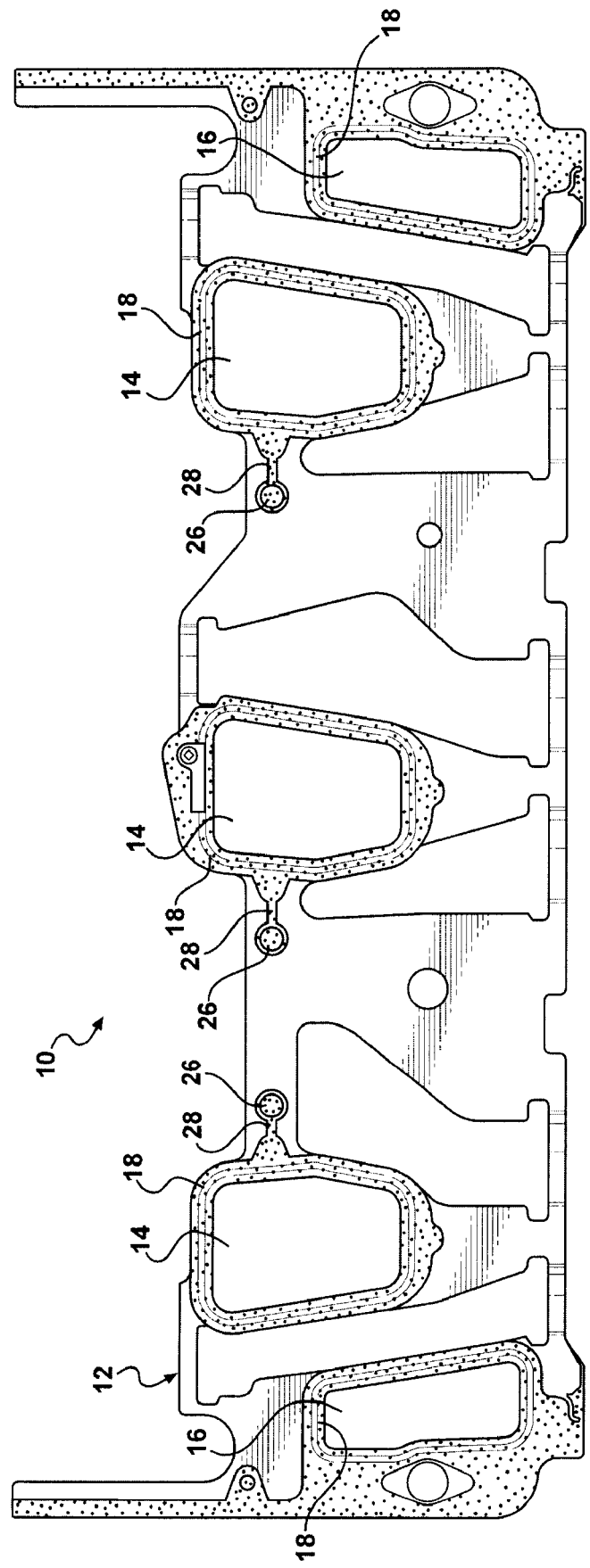
FIG. 1 is a perspective view of a manifold gasket constructed according to a presently preferred embodiment of the invention.

A gasket assembly constructed according to a presently preferred embodiment of the invention is shown generally at 10 in the drawings and includes a gasket carrier body 12 formed with at least one and preferably a plurality of media-conveying openings, including air intake openings 14 and engine coolant openings 16. The openings correspond to media-conveying passages communicating between a cylinder head 20 and an intake manifold of an internal combustion engine 24 between which the gasket assembly 10 is to be clamped. Elastically resilient sealing material, such as rubber, is molded to the carrier body 12 in surrounding relation to at least some and preferably all of the media-conveying openings 14, 16 as illustrated best in FIG. 2. The elastomeric seal beads 18 are molded to both sides of the carrier body 12 and project from the carrier body 12 so as to be compressed when the gasket assembly 10 is clamped between the cylinder head 20 and intake manifold 22.

The gasket assembly is provided with at least one and preferably a plurality of pushrod guides 26. The pushrod guides 26 are preferably formed adjacent each of the air intake openings 14. The pushrod guides 26 are spaced inwardly from an outer periphery of the carrier body 12 and project out of the plane of the carrier body 12. Each pushrod guide 26 preferably has a single tapered pin configuration, although other shapes are contemplated by the invention. The pushrod guides 26 are fabricated of a material different than that of the carrier body 12. The pushrod guides 26 are preferably molded of the same elastomeric material as that used to form the sealing beads 18 surrounding the openings 14. It is preferred that the pushrod guides 26 be fabricated entirely of the elastomeric seal material 18. The invention contemplates that different sealing materials may be used for different openings and for different gaskets, and that the guides 26 can be made of the same or different material than that of the sealing beads 18.

Figure 2:
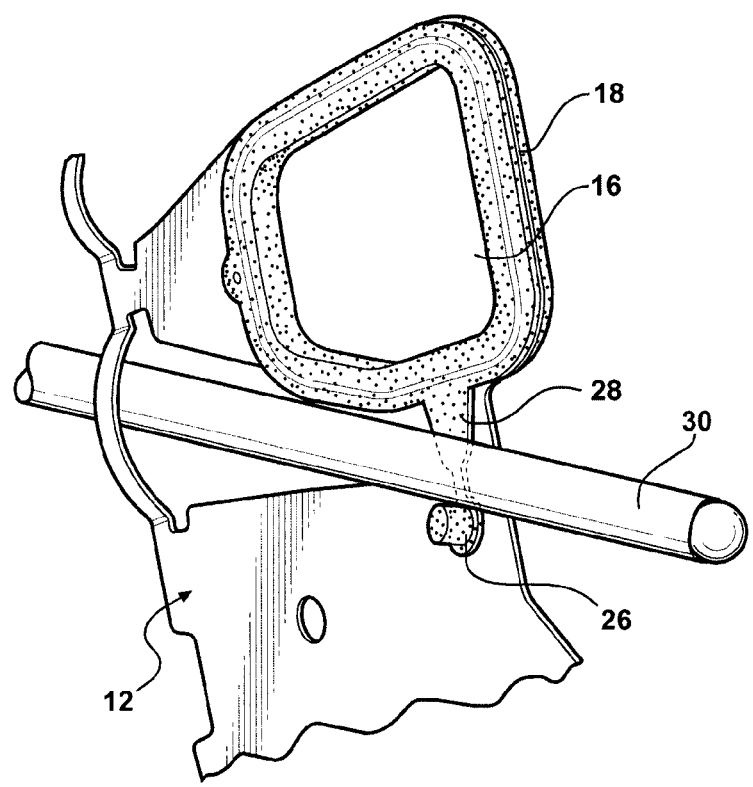
FIG. 2 is an enlarged fragmentary perspective view showing details of the pushrod guide portion of the gasket assembly of FIG. 1.
Figure 3:
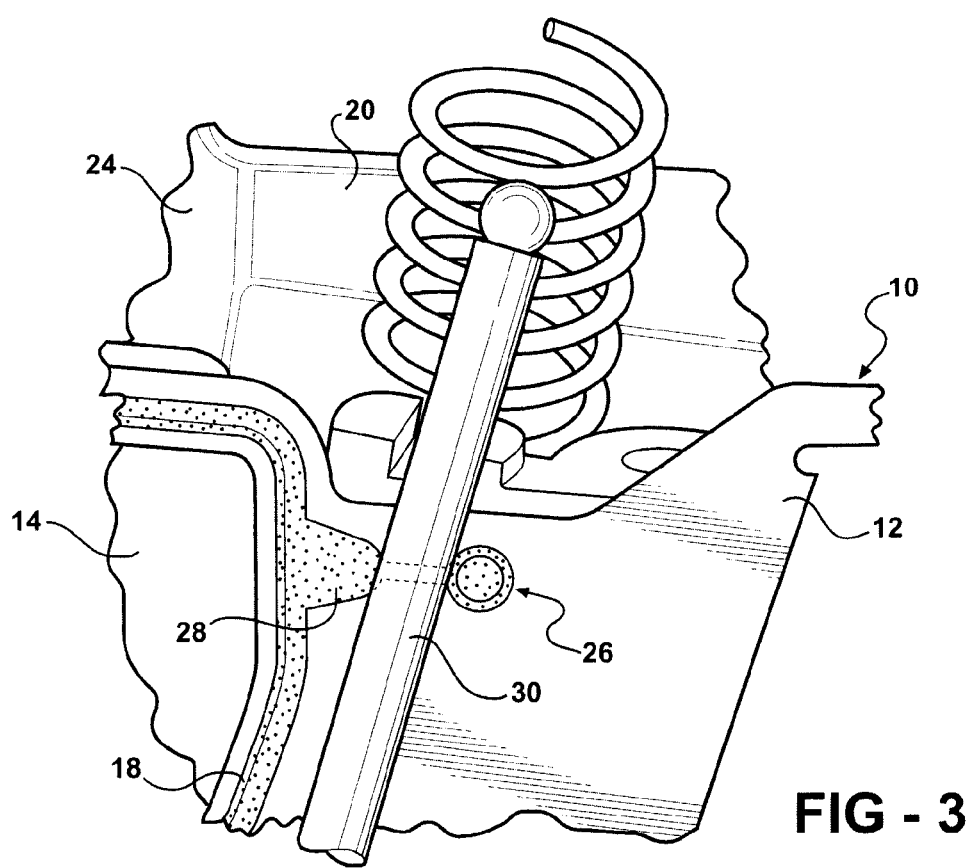
FIG. 3 is an enlarged fragmentary plan view showing the gasket installed on the cylinder head and guiding the installation of the pushrod.

As shown best in FIG. 2, the pushrod guides 26 are spaced laterally from the openings 14. The guides 26 may be connected to the elastomeric seal material 18 that surrounds the openings by an intervening connecting webs 28 that extend across a surface of the carrier body 12 and underlie the pushrod 30 when in use, as illustrated in FIG. 3. As also illustrated in FIG. 4, the pushrod guides 26 serve as a lateral stop to help guide the pushrod 30 during its installation in the engine. Following installation, the pushrod guides 26 do not interact with the pushrods during operation of the engine (the pushrods are spaced from the guides in operation), but are only used for guiding installation of the pushrods 30.

Obviously, many modifications and variations of the present invention are possible in light of the above teachings. It is, therefore, to be understood that within the scope of the appended claims, the invention may be practiced otherwise than as specifically described.

What is claimed is:

1. A manifold gasket assembly for an internal combustion engine, comprising;
    a metal gasket carrier body having a substantially planar surface and a plurality of media-conveying openings;
    an elastomeric sealing material molded to said carrier body in surrounding relation to at least one of said openings; and
    a push rod assembly guide adjacent said at least one opening fabricated of said elastomeric seal material and having a pin configuration projecting from a surface of said carrier body in position to assist in laterally guiding a push rod of an engine in which the gasket assembly may be installed during installation of the push rod, said push rod assembly guide configured to laterally guide the push rod as the push rod lies substantially parallel to said metal gasket carrier body on said substantially planar surface during a pre-assembly stage, said push rod assembly guide positioned to not interact with the push rod after installation;
    said push rod guide projecting in a direction substantially traverse to said substantially planar surface of said carrier body and being fabricated entirely of said elastomeric sealing material.

2. The assembly of claim 1 wherein said pin configuration has a tapered configuration.

3. The assembly of claim 1 wherein said elastomeric material is a rubber material.

4. A manifold gasket assembly for an internal combustion engine, comprising;
    a metal gasket carrier body having a substantially planar surface and a plurality of media-conveying openings;
    a first elastic non-metallic seal material disposed on said carrier body in surrounding relation to at least one of said openings; and
    a push rod assembly guide adjacent said at least one opening projecting from said carrier body to provide a push rod guiding surface and fabricated of a second elastic, non-metallic material, said push rod assembly guide positioned remotely from the push rod after installation;
    said push rod guide projecting in a direction substantially traverse to said substantially planar surface of said carrier body and being fabricated entirely of said second elastic non-metallic material, said push rod assembly guide configured to align a push rod while it lies prone on said substantially planar surface during a pre-assembly stage.

5. The assembly of claim 4 wherein said first elastic non-metallic seal material and said second elastic non-metallic material are the same.

6. The assembly of claim 4 wherein said push rod assembly guide has a tapered configuration.

7. The assembly of claim 4 wherein said first and second elastomeric materials are rubber materials.

8. A manifold gasket device for an internal combustion engine comprising:
    a metal carrier body member;
    said metal carrier body member having a substantially planar configuration and a plurality of media-conveying openings therein;
    an elastomeric sealing material molded to said carrier body member in surrounding relation to at least two of said openings; and
    pin shaped push rod guide members molded to said carrier body member adjacent to said two of said openings;
    said push rod guide members being made entirely of said elastomeric sealing material and projecting substantially perpendicular to said substantially planar configuration of said carrier body member, said push rod guide members located in a position on said metal carrier body member such that they do not interact with push rod members after installation;
    said pin shaped push rod guide members being positioned to laterally guide installation of push rod members in an engine.

9. The assembly of claim 8 wherein said elastomeric material is a rubber material.

10. The assembly of claim 8 wherein said pin shaped push rod guide members have tapered configurations.

* * * * *